United States Patent [19]

Olofsson

[11] Patent Number: 5,758,595
[45] Date of Patent: Jun. 2, 1998

[54] AUTOMATIC MILKING MEANS REMOVAL DEVICE

[75] Inventor: Hans Olofsson, Huddinge, Sweden

[73] Assignee: ALFA Laval AGRI AB, Tumba, Sweden

[21] Appl. No.: 615,222

[22] PCT Filed: Sep. 14, 1994

[86] PCT No.: PCT/SE94/00854

§ 371 Date: Mar. 14, 1996

§ 102(e) Date: Mar. 14, 1996

[87] PCT Pub. No.: WO95/07606

PCT Pub. Date: Mar. 23, 1995

[30] Foreign Application Priority Data

Sep. 16, 1993 [SE] Sweden ................... 9303021

[51] Int. Cl.$^6$ ................... A01J 3/00; F16H 57/08
[52] U.S. Cl. ................... 119/14.18; 475/331; 119/14.08
[58] Field of Search ................... 119/14.1, 14.08, 119/14.18; 475/331, 149, 317, 335, 339

[56] References Cited

U.S. PATENT DOCUMENTS 3,603,292   9/1971   Finch .
3,789,798   2/1974   Reisgies et al. .
4,238,967   12/1980  Volkov et al. ................... 475/331

FOREIGN PATENT DOCUMENTS 138428      5/1975   Norway .
SE9200457   6/1992   WIPO .

*Primary Examiner*—John G. Weiss
*Assistant Examiner*—David J. Cho
*Attorney, Agent, or Firm*—Hovey, Williams, Timmons & Collins

[57] ABSTRACT

A device for automatic removal of milking equipment from an animal's udder comprises a motor, a rotatable removal member, an elongated pulling member connected to the removal member at its one end and adapted to be connected to the milking equipment at its other end, and a gear change device positioned between and connected to the motor and the removal device. According to the invention the gear change device has a first gear change member connected to the motor, a second gear change member connected to the removal member, and a third gear change member moveable between a first and a second position, in order to achieve engagement and disengagement, respectively, of the removal member relative to the motor.

16 Claims, 4 Drawing Sheets

AUTOMATIC MILKING MEANS REMOVAL DEVICE

FIELD OF THE INVENTION

The present invention relates to a device for automatic removal of a milking means from an animal's udder, comprising a motor, a drive shaft operably connected to the motor, a rotatable removal means, an elongated pulling means connected to the removal means at its one end and arranged to be connected to the milking means at its other end, wherein the removal means is adapted to pull the milking means off the udder by means of the pulling means, when the removal means is rotated in a given rotational direction, a gear change device positioned between and coupled with the drive shaft and the removal means, and a housing, which houses the gear change device, the gear change device having a first gear change means connected to the motor via the drive shaft and a second gear change means connected to the removal means.

BACKGROUND OF THE INVENTION

Such a removal device, which is known from WO 93/00002, has great advantages, since it may be designed in very small dimensions and with a low weight. In the known removal device, the removal means comprises a cord drum with a cord adapted to be connected to the milking means. However, the known removal means has a drawback, since it has appeared that a mechanical resistance must be overcome each time the cord is to be pulled out from the cord drum in connection with attachment of the milking means onto the teats of an animal. The reason for this resistance is partly the motor, which is connected to the cord drum during the operation thereof, partly the gear change device which increases the torsional resistance of the cord drum. When pulling out the cord from the cord drum it may certainly be considered that the resistance of the removal device is not particularly strong, but in connection with repeated pull outs it has, after all, appeared that the resistance may be strenuous for the milker to overcome.

OBJECT OF THE INVENTION

The object of the present invention is to achieve an automatic removal device of the above described kind, which removes the above described disadvantage of said known removal device.

SUMMARY OF THE INVENTION

This object is achieved by means of a device of the initially described kind, which is characterized in that the gear change device has a third gear change means movable between a first position, in which it is held substantially immovable relative to the housing of the gear change device, and a second position, in which it is movable relative to the housing of the gear change device, and in that the third gear change means is adapted to operably connect the drive shaft of the motor to the removal means via said first and second gear change means, when the third gear change means is in said first position and to achieve disengagement of the removal means from the drive shaft of the motor, when the third gear change means is in said second position. Thus, the pulling means, for example a cord, may be easily pulled out from the removal means for attachment of the milking means onto the animal's udder without resistance from the motor and the gear change device, when the motor is not in operation.

Preferably the first, the second and the third gear change means have a common axis, wherein the third gear change means is axially movable along said axis between said first position, in which it engages the housing of the gear change device, and said second position, in which it is disengaged from the housing and is rotatable about said axis.

It is furthermore advantageous that the third gear change means forms a movable wall in a chamber in the housing of the gear change device, that the housing of the gear change device has at least one connecting channel for connection of said chamber to a pneumatic source adapted to generate a pressure different from the atmospheric pressure and wherein the third gear change means is adapted to be moved along said axis to engagement with the housing of the gear change device when said chamber is exposed to said pressure.

Suitably, the third gear change means has an axially directed side, relative to the axis of rotation, which side is designed for engagement with the housing of the gear change device.

Advantageously, said source is a source of negative pressure, the chamber in the housing of the gear change device being defined by said axially directed side of the third gear change means.

Advantageously, the motor is a pneumatically operable sliding vane motor comprising a rotor arranged eccentrically in a cylindrical housing, said housing of the motor and the housing of the gear change device being pneumatically connected to each other, i.e. the interior of the housing of the motor and the interior of the housing of the gear change device are connected to each other by a connection channel, so that communication between the both housings is enabled.

Preferably, the gear change device is a planetary gearing, comprising a sun wheel, a crown wheel and at least one planet wheel. Alternatively, any one of the three said gear change means can constitute any one of the said wheels, i.e. the sun wheel, the crown wheel or the planet wheel can permutedly be connected to the motor, the cord drum or the housing of the gear change device.

BRIEF DESCRIPTION OF THE DRAWINGS

The invention will now be closer described with reference to the accompanying drawings, in which.

DETAILED DESCRIPTION OF PREFERRED EMBODIMENTS OF THE INVENTION

Figure 1:
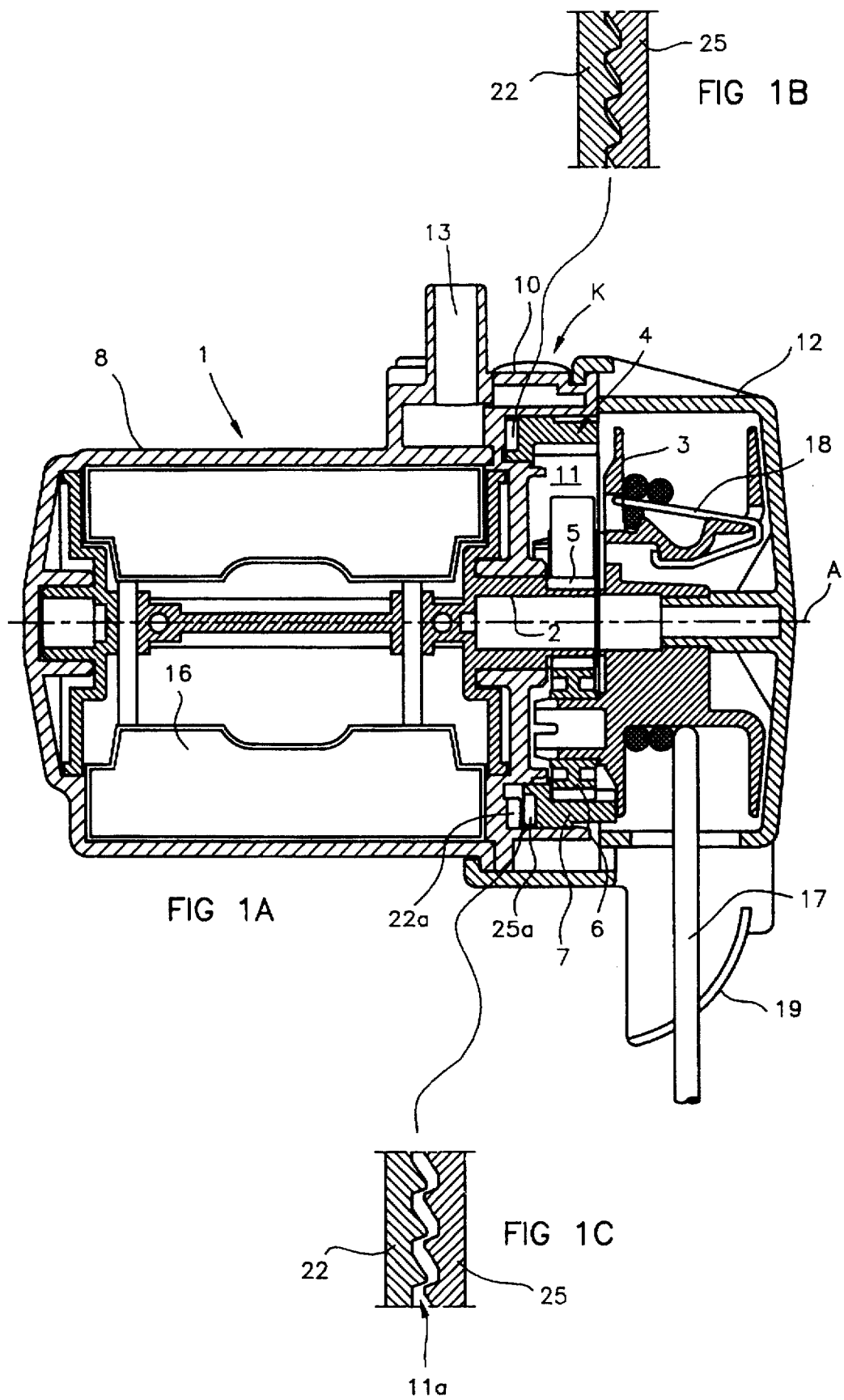
FIG. 1A is a view of a longitudinal section through a removal device according to a preferred embodiment of the invention.
FIG. 1B shows a detail in enlargement of a coupling device in engaged state of the removal device according to FIG. 1A.
FIG. 1C shows the same detail as shown in FIG. 1B, but with the coupling device in unengaged state.
Figure 2:
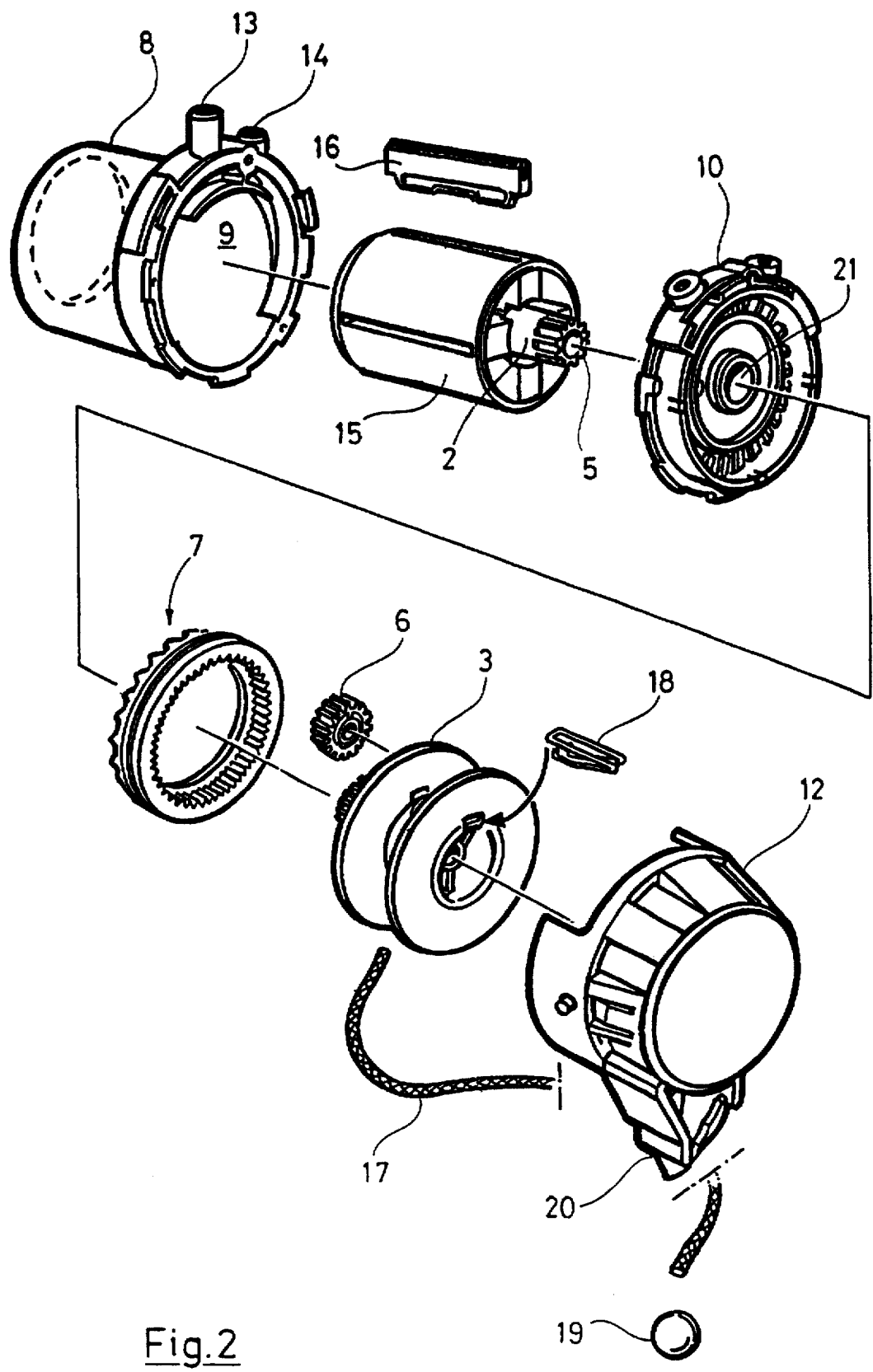
FIG. 2 is an exploded view illustrating details of a motor, a gear change device, a housing for the gear change device, and a removal means of the removal device according to FIG. 1A.

The removal device according to the invention shown in FIGS. 1A and 2 comprises a motor 1 with a drive shaft 2, which is connected to a removal means in the form of a cord drum 3 via a gear change device 4, for achieving required torque. From i.e. a spacial point of view this gear change device 4 has been chosen to comprise a planetary gearing with a housing belonging thereto, even though other gear change devices would be possible to use.

The planetary gearing 4 comprises a first gear change means in the form of a sun wheel 5 connected to the drive shaft 2 of the motor, a second gear change means in the form of three planet wheels 6 connected to the cord drum 3 and a third gear change means in the form of a crown wheel 7 adapted to be releasably engaged with the housing of the planetary gearing.

The motor 1 is equipped with a housing 8, which forms a cylindrical chamber 9. One end of the housing 8 of the motor is provided with a wall, which also forms one of the walls for the housing of the planetary gearing and, hence, constitutes an intermediate wall 10 between the chamber 9 of the motor and the chamber 11 of the planetary gearing 4.

The housing of the planetary gearing is formed by the intermediate wall 10 and a casing 12, wherein the chamber 11 of the planetary gearing also houses the cord drum 3. The intermediate wall 10 and the crown wheel 7 delimit a part chamber 11a of the chamber 11 (see FIG. 1C). The housing 8 of the motor 1 is provided with an inlet 13 and an outlet 14 for connection to a source of vacuum (not shown) for operation of the motor.

In the motor's chamber 9 is arranged a rotor 15 provided with vanes 16 radially movable in relation to an axis A through the rotor 15, which axis is coaxial with the motor's 1 driving shaft 2. The rotor is arranged eccentrically in the motor's chamber 9, so that the vanes 16 are forced to move in a radial direction during the rotor's 15 rotation. When connecting the vacuum source, this causes a pressure difference in the motor's chamber 9. The pressure difference acts upon the vanes 16, which in turn force the rotor 15 to rotate.

A cord 17 is at its one end releasably connected to the cord drum 3 by means of a connection means 18. The connection means 18 is arranged such that the cord 17 comes loose from the cord drum 3 if the cord is exposed to a too large, external pulling force when the cord is completely pulled out from the cord drum 3, and is solely held in place by means of the connection means 18. The cord 17 is at its other end intended to be connected to the milking means (not shown), as described in WO 93/00002.

The cord 17 is provided with a stop member in the form of a ball 19. The ball 19 prevents the milking means from hitting the removal means during winding the cord 17. The casing 12 is provided with a catch means 20, through which the cord 17 freely runs, but which does not let the ball 19 through. In the motor's 1 rest position, which will be closer described below, the catch means 20 catches the ball 19 and prevents the cord 17 from being unwound from the cord drum 3. In this way, the whole weight of the milking means can be taken up by the removal device via the catch means 20, when the motor 1 is in said rest position.

Figure 3A:
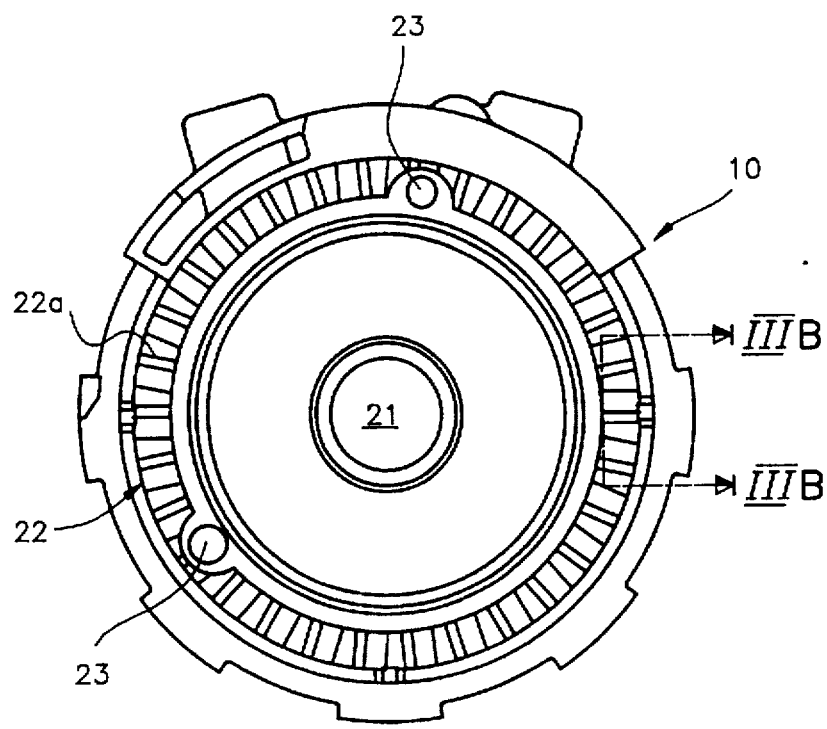
FIG. 3A shows a view of the interior of the housing illustrated in FIG. 2.
Figure 3B:
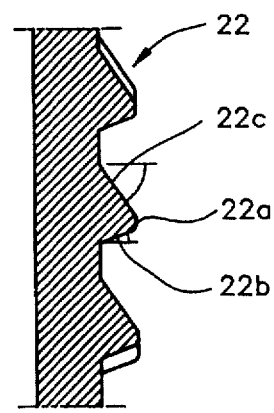
FIG. 3B shows a section in enlargement along the line IIIB—IIIB in FIG. 3A.

FIG. 3A is a front view of the part of the intermediate wall 10, which forms an inner, axially directed wall of the housing 10, 12 of the planetary gearing 4. Centrally in the intermediate wall 10 an opening 21 is formed for reception of the motor's driving shaft 2 with the sun wheel 5 arranged thereon. The intermediate wall 10 is at its periphery provided with a ring 22 of an axially directed friction enhancing means, which ring 22 is coaxial with the opening 21 (see FIG. 3B). The intermediate wall 10 is furthermore provided with two passages 23 for pneumatically connecting said part chamber 11a to the motor's 1 chamber 9. Alternatively, more or less passages than two can certainly be provided in the intermediate wall 10.

Figure 4A:
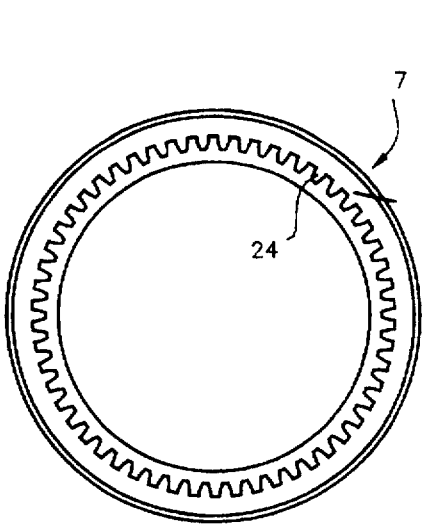
FIGS. 4A and 4B show views of two opposite sides of a gear change means of the gear change device illustrated in FIG. 2.
Figure 4B:
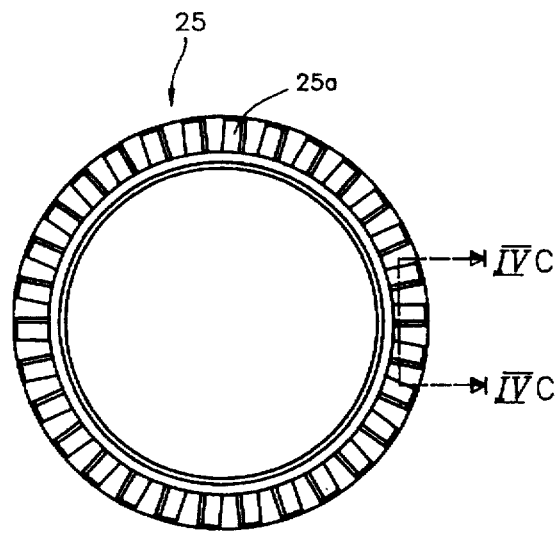
Figure 4C:
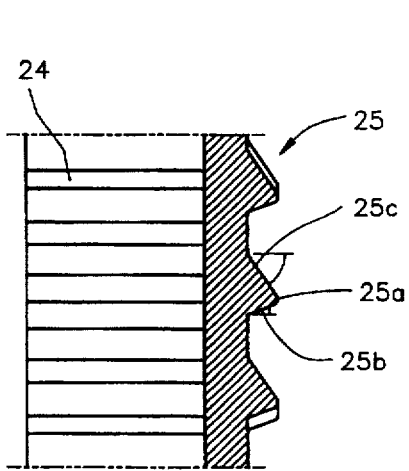
FIG. 4C shows a section in enlargement along the line IVC—IVC in FIG. 4B.

In FIG. 4A is shown the planetary gearing's 4 crown wheel 7 seen from the direction which faces away from the intermediate wall 10 and towards the cord drum 3. The crown wheel 7 is provided with a ring 24 of teeth directed radially inwards. In FIG. 4B is shown the side of the planetary gearing's crown wheel 7, which faces the intermediate wall 10. On this side the crown wheel 7 is at its periphery provided with a ring 25 of an axially directed friction enhancing means, which ring is coaxial with the axis of the crown wheel 7 (see FIG. 4C).

The friction enhancing means on the intermediate wall 10 and the crown wheel 7, respectively, are shown in the FIGS. 3A, 3B, 4B and 4C as teeth 22a, 25a having a form substantially similar to a saw tooth, i.e. with non uniformly inclined back rakes, 22b, 25b and 22c, 25c, respectively. The back rakes of each tooth form angles α and β, respectively, with the base of the tooth, α being about 20° and β being about 55°. For reasons explained below these friction enhancing means do not need to consist of teeth 21a, 25a, but could as well on the one hand comprise plain, substantially plane, friction surfaces and on the other hand comprise a mechanical coupling in the form of a pin or the like.

Figure 5:
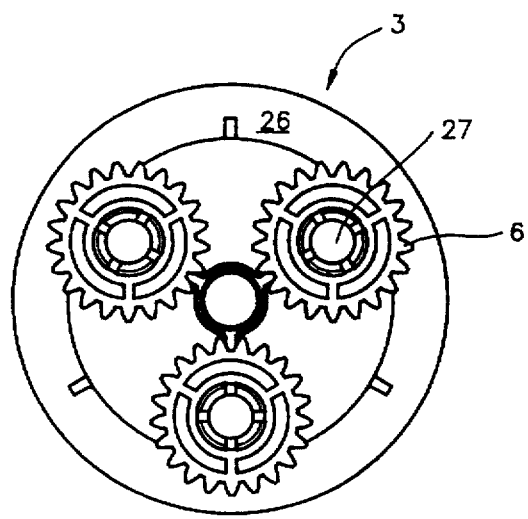
FIG. 5 shows a view of a further gear change means of the gear change device mounted on the removal means shown in FIG. 2.

FIG. 5 illustrates one end wall 26 of the cord drum 3, provided with three axes 27, each being provided with a planet wheel 6 with teeth. The planet wheels 6 fit between the crown wheel 7 and the sun wheel 5. Of course the teeth of the crown wheel 7 and the sun wheel 5 fit the teeth of the planet wheels 6.

Function

On finished milking, which is sensed by a milk flow meter known per se, but not shown, the removal device receives a signal to start the motor 1 for winding the cord 17 onto the cord drum 3. The milking means, which is connected to the cord 17, is hereby pulled away from the teats of the animal.

When the signal is given that the motor 1 shall start, the motor 1 is connected to a source of vacuum, which is suitably the same as the one that operates the milking means. The negative pressure which is thereby created in the chamber 9 of the motor drives the motor 1 such that it rotates. Via the passages 23 in the intermediate wall 10 the chamber 11 of the planetary gearing 4 is pneumatically connected to the motor's chamber 9, such that also the planetary gearing's 4 chamber 11, like its part chamber 11a, is exposed to a negative pressure. In consequence, the crown wheel 7, which is arranged closely to the intermediate wall 10 and in front of the said passages 23, is sucked against the intermediate wall 10 and is anchored on this.

Accordingly, the crown wheel 7 of the planetary gearing 4 works together with the intermediate wall 10 as parts of a coupling device K between the motor 1 and the cord drum 3. It shall be remarked, though, that the crown wheel 7 need not necessarily be anchored in a pneumatical way. The anchorage could as well be achieved in a plain mechanical way by locking by means of pins or by a clamping means of any known kind. Alternatively, such an anchorage would be possible to accomplish in an electromechanical way, for example by means of a magnet or a solenoid, which pushes or pulls the crown wheel 7 against the intermediate wall (see FIG. B).

The engagement of the crown wheel 7 with the intermediate wall 10 is achieved by means of two differently directed forces, namely a relative to the crown wheel 7, axially acting, retaining force, which is achieved by means of the negative pressure in the part chamber 11a, and a force acting in the circumferential direction of the crown wheel 7, which force is achieved by means of the friction enhancing means. Outgoing from this it is understood that the said engagement can be achieved by means of a frictional engagement between plane friction surfaces. In such a case, the friction enhancing means may consist of plane friction coatings. However, it is desirable that different properties of engagement in different directions of rotation of the crown wheel 7 be achieved and for this reason the differently back raked teeth 22a, 25a are preferred. The reason for this is that the substantially axially directed back rakes 22b, 25b of the teeth on the crown wheel 7 and the intermediate wall 10 together provide a relatively stable hooking of the teeth 22a, 25a in the direction of winding, whereas the more sloping back rakes 22c, 25c form an extra protection against overload for the removal device, since they will without difficulty disconnect by a load directed opposite to the winding direction.

Having the crown wheel 7 anchored on the intermediate wall 10 the sun wheel's 5 rotation of the planet wheels 6 results in rotation of the last mentioned wheels along the crown wheel 7 and about the sun wheel 5, such that the cord drum 3 is turned. The cord drum 3 thus winds the cord 17 so that the milking means is pulled off the animal's udder. Before the cord is pulled in too far on the cord drum 3, it is stopped by the catch means 20, which catches the ball 19 arranged on the cord 17.

When the milker is to move the milking means and the removal device to the next animal to be milked, the milker loosens the connection means from the vacuum source, which results in that the motor 1 assumes the above mentioned rest position and is no longer driven, since there is no longer a negative pressure in the chamber 9 of the motor. Furthermore, no negative pressure will be transmitted through the passages 23 in the intermediate wall 10, which means that the crown wheel 7 is disengaged from the intermediate wall 10 (see FIG. 1C).

When the crown wheel 7 now is freely movable and can move with less friction than the motor 1 on which the sun wheel 5 is arranged, the planet wheels 6 rotate about the sun wheel 5 while this only moves insignificantly or not at all. Accordingly, the cord drum 3 is now disengaged from the motor 1. The ball 19 is still in the catch means 20, which prevents rotation of the disengaged cord drum 3.

When the next animal is to be milked, the milker first disengages the ball 19 from the catch means 20. Owing to the freely movable crown wheel 7 the milker can thereafter pull out the cord from the removal means without resistance from the motor 1 and the planetary gearing 4. The milking means which is now connected to the source of vacuum, will be attached to the animal's teats, where it remains until a signal is given for finished milking.

The invention is not delimited to the embodiment shown here. Hence, the crown wheel 7 may be arranged to be affected by a positive pressure instead of by vacuum. It is also not necessary to use a pneumatic sliding vane motor, but a pneumatic cylinder, an electrical motor or a spiral spring would be possible to use in order to achieve rotation of the cord drum for the winding of the cord.

I claim:
1. A device for automatic removal of a milking means from an animal's udder, comprising:
   a motor;
   a drive shaft operably connected to the motor;
   a rotatable removal means;
   an elongated pulling means connected to the removal means at its one end and arranged to be connected to the milking means at its other end, wherein the removal means is adapted to pull the milking means off the udder by means of the pulling means when the removal means is rotated in a given rotational direction;
   a gear change device positioned between and connected to the drive shaft and the removal means; and
   a housing which houses the gear change device, the gear change device having a first gear change means connected to the motor via the drive shaft and a second gear change means connected to the removal means;
   wherein the gear change device has a third gear change means movable between a first position, in which it is held substantially immovable relative to the housing of the gear change device, and a second position, in which it is movable relative to the housing of the gear change device, and in that the third gear change means is adapted to operably connect the drive shaft of the motor to the removal means via said first and second gear change means when the third gear change means is in said first position and to achieve disengagement of the removal means from the drive shaft of the motor when the third gear change means is in said second position, and wherein the first, the second and the third gear change means have a common axis, the third gear change means being axially movable along said axis between said first position, in which it engages the housing of the gear change device, and said second position, in which it is disengaged from the housing and is rotatable about said axis.

2. A device according to claim 1, wherein the third gear change means forms a movable wall in a chamber in the housing of the gear change device, that the housing of the gear change device has at least one passage for connection of said chamber to a pneumatic source adapted to generate a pressure different from the atmospheric pressure and that the third gear change means is adapted to be moved along said axis to engagement with the housing of the gear change device when said chamber is exposed to said pressure.

3. A device according to claim 2, wherein that the gear change device is a planetary gearing.

4. A device according to claim 3, wherein the third gear change means has an axially directed side relative to the axis of rotation, designed for engagement with the housing of the gear change device.

5. A device according to claim 4, wherein the motor is a pneumatically operable sliding vane motor comprising a housing forming a cylindrical chamber, and a rotor eccentrically provided in the cylindrical chamber which is connectible to said pneumatic source.

6. A device according to claim 4, wherein the gear change device is a planetary gearing.

7. A device according to claim 4, wherein said source is a source of negative pressure and that a part chamber of the chamber in the housing of the gear change device is defined by said axially directed side of the third gear change means, the passage opening into the part chamber.

8. A device according to claim 7, wherein the motor is a pneumatically operable sliding vane motor comprising a housing forming a cylindrical chamber, and a rotor eccentrically provided in the cylindrical chamber which is connectible to said pneumatic source.

9. A device according to claim 7, wherein the gear change device is a planetary gearing.

10. A device according to claim 3 wherein the motor is a pneumatically operable sliding vane motor comprising a housing forming a cylindrical chamber and a rotor eccentrically provided in the cylindrical chamber which is connectable to said pneumatic source.

11. A device according to claim 10, wherein the gear change device is a planetary gearing.

12. A device according to claim 10, wherein the chamber of the motor and the chamber of the gear change device are pneumatically connected to each other.

13. A device according to claim 12, wherein the gear change device is a planetary gearing.

14. A device according to claim 1 wherein the gear change device is a planetary gearing.

15. A device according to claim 14, wherein the first gear change means comprises a sun wheel, that the second gear change means comprises at least one planet wheel and said third gear change means comprises a crown wheel.

16. A device according to claim 1, wherein that the gear change device is a planetary gearing.

* * * * *